Dec. 4, 1945.  H. G. STEINMETZ  2,390,398
MACHINE FOR APPLYING STRIPS OF MATERIAL TO CURVED SURFACES
Filed Jan. 7, 1943  8 Sheets-Sheet 1

INVENTOR.
BY HARRY G. STEINMETZ
Van Deventer + Grier
ATTORNEYS.

Dec. 4, 1945.　　　H. G. STEINMETZ　　　2,390,398
MACHINE FOR APPLYING STRIPS OF MATERIAL TO CURVED SURFACES
Filed Jan. 7, 1943　　　8 Sheets-Sheet 3

Fig. 3.

INVENTOR.
HARRY G. STEINMETZ
BY
Van Deventer + Grier
ATTORNEYS.

Dec. 4, 1945.  H. G. STEINMETZ  2,390,398
MACHINE FOR APPLYING STRIPS OF MATERIAL TO CURVED SURFACES
Filed Jan. 7, 1943   8 Sheets-Sheet 4

INVENTOR.
HARRY G. STEINMETZ
BY
Van Deventer + Grier
ATTORNEYS.

Dec. 4, 1945.  H. G. STEINMETZ  2,390,398
MACHINE FOR APPLYING STRIPS OF MATERIAL TO CURVED SURFACES
Filed Jan. 7, 1943  8 Sheets-Sheet 7

INVENTOR.
HARRY G. STEINMETZ
BY
Van Deventer + Grier
ATTORNEYS.

Patented Dec. 4, 1945

2,390,398

UNITED STATES PATENT OFFICE 2,390,398

MACHINE FOR APPLYING STRIPS OF MATERIAL TO CURVED SURFACES

Harry G. Steinmetz, Port Chester, N. Y., assignor to E. V. Hadley, New York, N. Y.

Application January 7, 1943, Serial No. 471,561

9 Claims. (Cl. 154—41)

This invention relates to improvements in machines for applying strips of material to curved surfaces, and is directed more particularly to an improved device for covering the surfaces of drawing rolls with parchment paper or other suitable materials. These drawing rolls are used in spinning machines, and the kind of material applied to their surfaces and the exactitude of the applications are conducive to the production of uniformly superior yarns.

Another object of the invention is the provision of a machine for applying a definite number of layers, and/or fractions thereof, of strip material to drawing rolls, thereby providing the latter with working surfaces having uniform characteristics.

A further object of the invention is the provision in a machine for applying a definite number of layers and/or fractions thereof, of strip material to drawing rolls, and means for changing the number of layers.

Other objects of the invention will be apparent to those skilled in the art upon the study of the following specification, in which the invention is described in connection with a preferred embodiment thereof.

Drawing rolls (sometimes called "top rolls") are used in connection with spinning, drawing, weaving and other textile machinery. An example of this use is in connection with the so-called "French" system of drawing in which wool in a dry state is prepared for the spinning frame.

Over the years many materials have been tried for forming working surfaces on drawings, and it has been found that the most practical material for this purpose is parchment paper, which up to the present time is applied to the surfaces of the rolls by hand.

The applying of strips of parchment paper or any other materials to the surfaces of drawing rollers is a tedious process as extra care must be taken to insure the uniform and proper application. Contrasted with this, my new and improved machine performs the operation automatically.

The machine may be set to apply a predetermined given length of material to each cylindrical portion of each roll assembly. The inner ends of the material are started onto the roll members in alignment (axially) with each other, and the outer ends are finished off in alignment with each other, pneumatic means aiding in this performance. The strip materials are carried in the machine in the form of rolls, and the strips are severed from the roll after their "inner" ends are started onto the surfaces of the drawing rolls. The machine includes means for applying a uniform coating of adhesive to the strips before they reach the drawing rolls. The machine operates cyclically, and as soon as one drawing roll has the material applied thereto, it moves out, and a succeeding one is fed into position to receive its material, etc.

The machine, therefore, applies the material rapidly and with absolute uniformity, and the drawing rolls treated thereby impart the maximum uniformity insofar as results are concerned in drawing and spinning operations.

Referring to the drawings, which illustrate a preferred embodiment of the invention.

Referring to Figures 1 to 5, inclusive, a suitable base 20 forms a support for a side plate 21 (Figure 1), the opposite side plate 22 (Figure 2), a motor 23, and a gear reduction 24.

The motor 23 (Figures 2, 3 and 5) carries grooved pulleys 25 and 26. The pulley 25 is connected by means of a belt 27 to a grooved pulley 28 carried on a shaft 29 extending from the gear-reduction unit 24. The pulley 26, which is provided for driving the knife, will presently be described.

Figures 1, 17, 18:
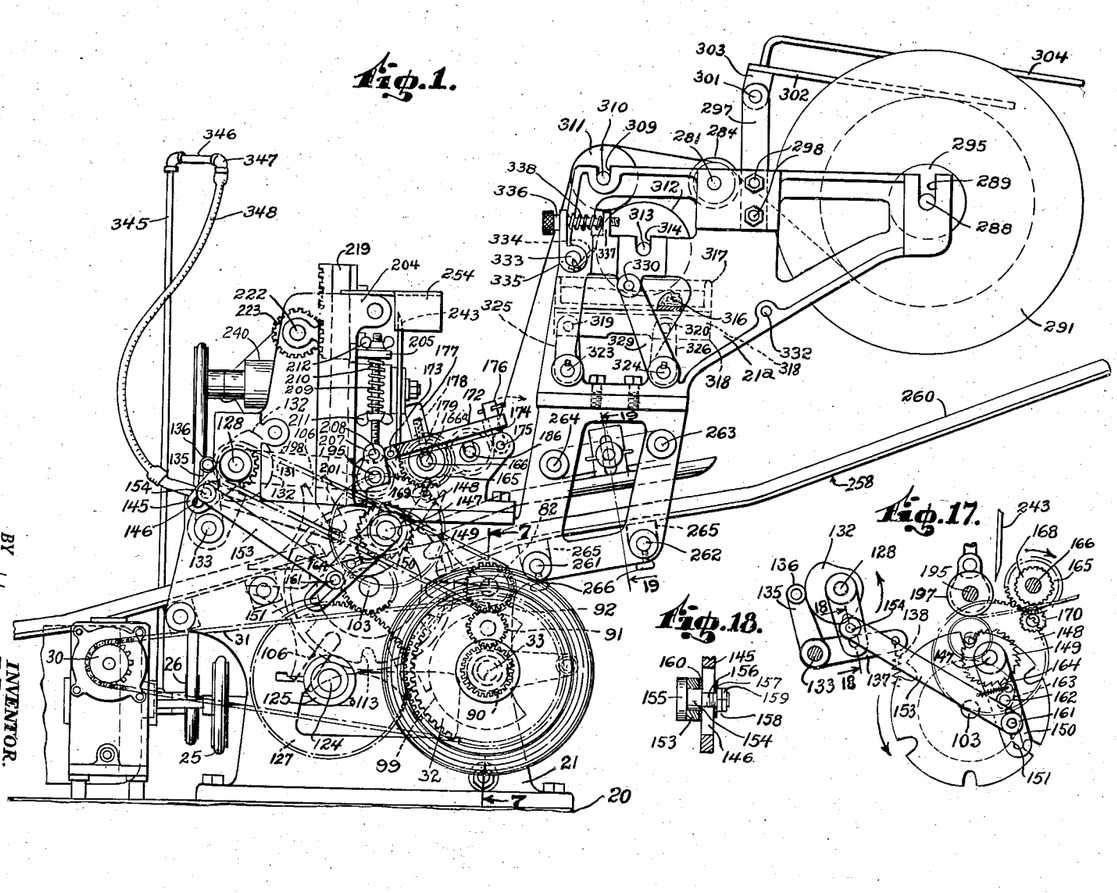
Figure 1 is a left side elevation of a machine for applying parchment paper strips to the surfaces of drawing rolls.
Figure 17 is a diagram showing the action of the ratchet for feeding the paper.
Figure 18 is a sectional elevation of one means for adjusting the linkage shown in Figure 17.
Figure 3:
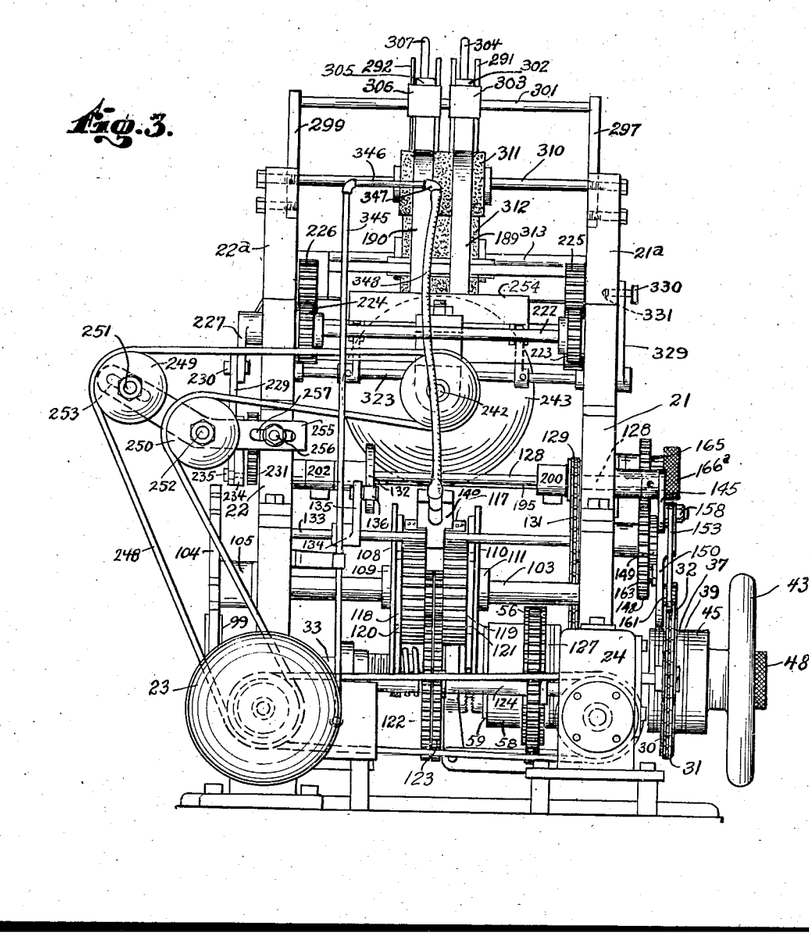
Figure 3 is an end elevation as seen from the left end of Figure 1.
Figures 4, 19:
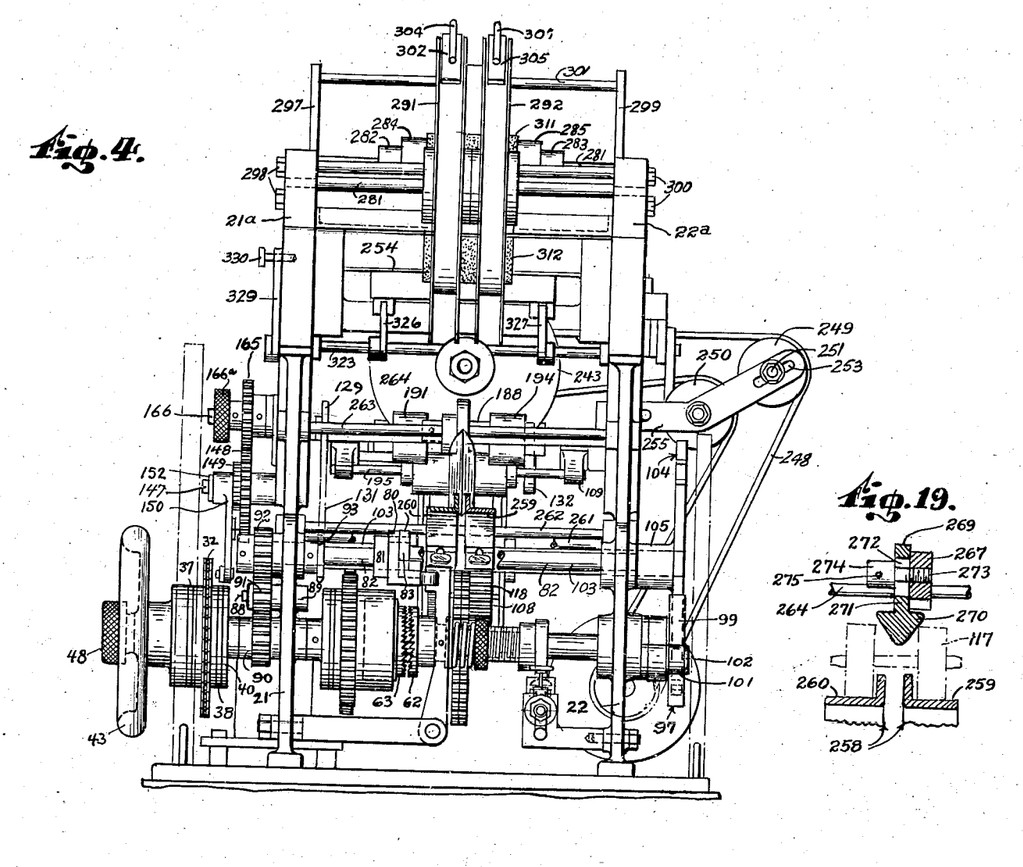
Figure 4 is an end elevation as seen from the right end of Figure 1.
Figure 19 is a sectional elevation showing the relation of the drawing roll trackway, the drawing rolls, and the guard rail for preventing the drawing rolls from piling up.
Figure 5:
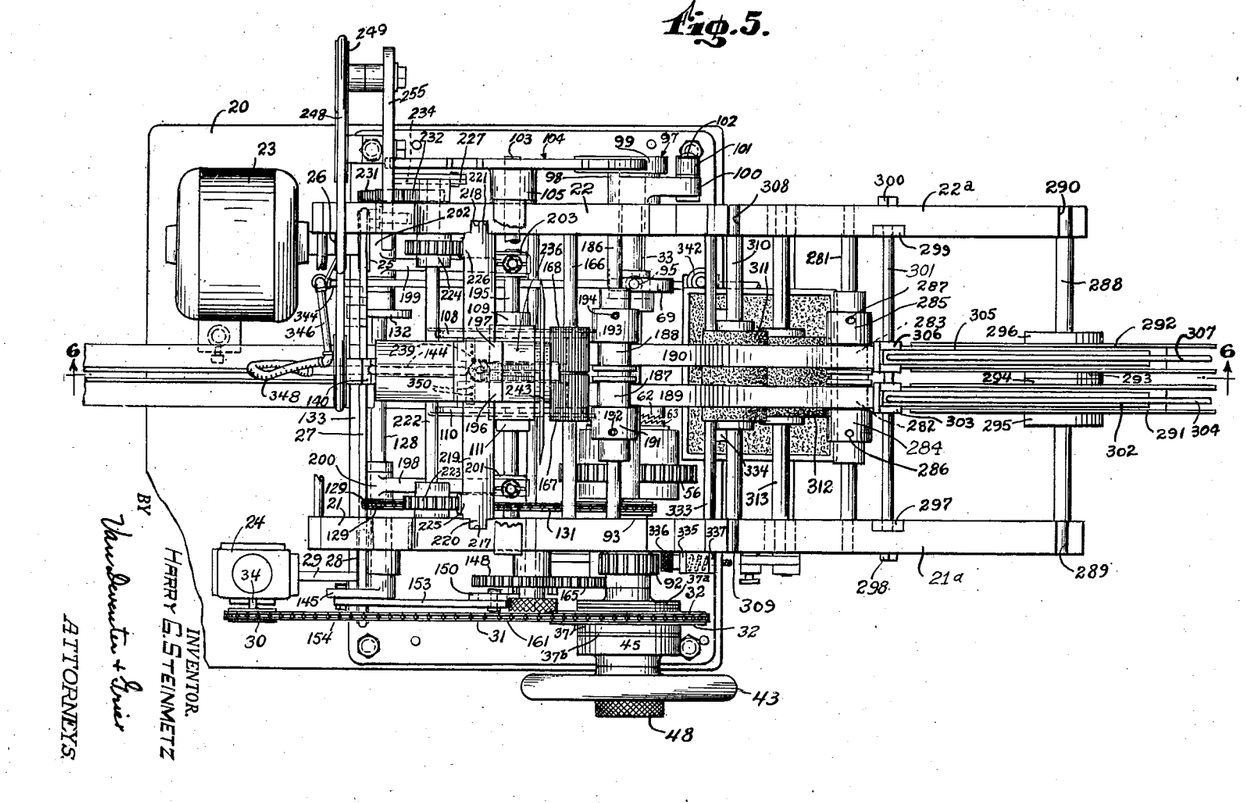
Figure 5 is a plan view of the machine.

A sprocket 30 mounted on a shaft 34 of the gear reduction unit 24 is operatively connected, by means of a chain 31, to a sprocket 32 carried on the main shaft 33 (Figures 1, 3 and 5). The main shaft 33 may best be seen in Figures 4 and 7; it is journaled in a bearing boss 35 formed in the side plate 22, and in a bearing boss 36 formed in the side plate 21.

Figure 7:
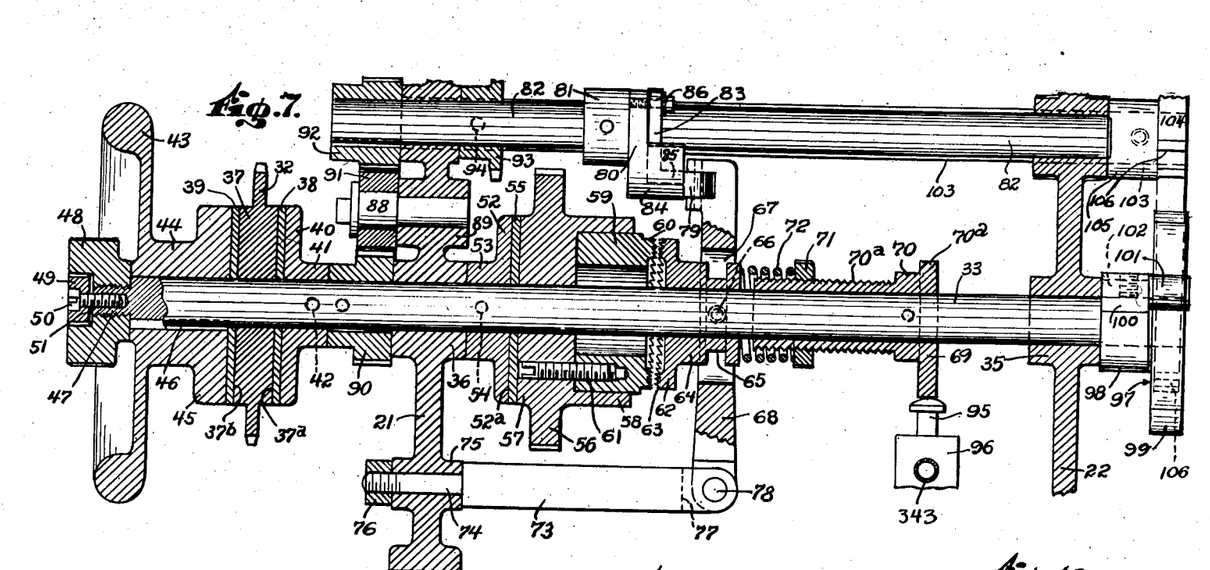
Figure 7 is a sectional elevation taken along the line 7—7 of Figure 1.

The sprocket 32 has a central hole formed therein which forms a working fit on the shaft 33. The hub portion 37 of the sprocket 32 has a surface 37ª adapted to be frictionally engaged, and a similar surface 37ᵇ. A disc 38 is positioned on the shaft 33 in contact with the surface 37ª, and a like disc 39 is also carried on the shaft 33 in contact with the surface 37ᵇ. A flange 40 has a hub 41 integral therewith, and this hub is bored out to fit a shaft 33, and is secured thereon by any suitable means, for example by means of a set screw 42.

A hand wheel 43 has a hub 44, a portion 45 of which is flanged and presents a surface adapted to be frictionally engaged by the disc 39. The hub 44 is secured to the main shaft 33 by means of a key 46.

The shaft 33 has a threaded portion 47 of reduced diameter. A knurled hand knob 48 threadedly engages the threaded portion 47. A metallic disc 49 is positioned in a recess formed in the hand knob 48, and is secured to the shaft 33 by means of a fillister head screw 50. A washer 51 between the metallic disc 49 and the end of the shaft 33 defines a clearance space between the inner face of the recess and the metallic disc 49.

The hand knob, as shown in Figure 7, has been tightened with the result that the hub of the hand wheel, the friction disc 39, the sprocket hub, the friction disc 38, and the flange 40 are all clamped together so that any motion imparted to the sprocket 32 by the chain 31 will cause the shaft 33 to rotate at the same speed that the sprocket 32 is rotated.

A flange 52, having a hub 53, is secured to the main shaft 33 in any suitable manner, for example by means of a set screw 54. The face 52ª of this flange engages one face of a friction disc 55 carried on the shaft 32.

A gear 56 has a hub portion 57 which is adapted to frictionally engage the opposite face of the disc 55. The gear 56 also has a hub portion 58 which is counter-bored, and within the counter-bore is mounted a cylindrical member 59 which carries teeth 60 and forms half of a clutch. The member 59 is secured in the counter-bore in any suitable manner, for example by means of a screw 61. The co-operating clutch member 62 carries teeth 63 adapted to normally engage the teeth 60. The hub 64 of this clutch member has a square groove 65 formed therein. This groove is oppositely engaged by rollers, one of which is designated by the numeral 66, which are in turn journalled on suitable studs formed within the opening 67 of a shifter arm 68.

Figure 13:
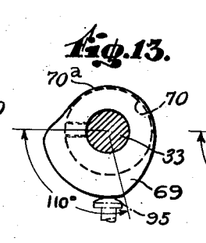
Figure 13 is a view of the compressed air valve cam.

A cam 69, secured to the shaft 33, has a hub 70, a portion 70ª of which is of reduced diameter and threaded. The face view of the cam 69 is shown in Fig. 13, and this cam is adapted to engage and actuate the plunger 95 of an air valve 96. A knurled ring 71 threadedly engages the threads on the portion 70ª and may be adjusted therealong. A helical spring 72 concentric with the shaft 33 bears upon the left face of the knurled ring 71, as viewed in Figure 7, and against the right end of the clutch member 62, thereby tending to urge the clutch member 62 into engagement with the clutch member 59.

The urge of the spring 72 against the clutch member 62 may be adjusted by means of the knurled ring 71.

A stud 73 has one end 74 of reduced diameter secured in a boss 75 in the side plate 21 by means of a nut 76. The opposite end is slotted to form a yoke 77. The shifter arm 68 has its lower end pivotally mounted on a cross pin 78 in the yoke 77. The upper end of the shifter arm 68 is slotted and carries a roller 79 adapted to be engaged by a cam for controlling the length of paper to be cut off by the paper knives, as will presently be described.

Figure 12:
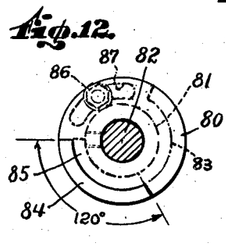
Figure 12 is a view of the clutch drive cam.
Figure 14:
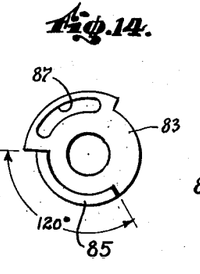
Figure 14 is a face view of the paper feed cam.
Figures 15, 16:
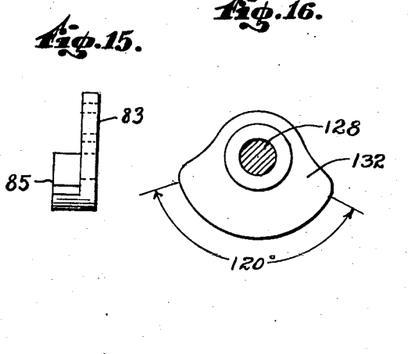
Figure 15 is a side elevation of the cam shown in Figure 14.
Figure 16 is a side view of the cam for moving the air nozzle.

This cam consists of a portion 80, the hub 81 of which is secured to a shaft 82. A face view of the portion 80 may be seen in Figure 12, and the portion 83 thereof for increasing the length of the paper fed is shown in Figure 14. In Figure 12, the portion 83 is superimposed in dotted lines so that the relative positions of the two may be visualized. The portion 80 has a cylindrical section 84, the right end of which, as viewed in Figure 7, engages the roller 79.

The portion 83 also has a cylindrical section 85 which is the same polar length as that of the cylindrical section 84. A bolt 86 passes through the arcuate slot 87 in the portion 83 and engages a tapped hole in the portion 80, so that the portion 83 may be set in different positions which increase the camming surface presented to the roller 79.

It will be readily understood that when the arcuate cylindrical portion 85 is set so that it coincides with the arcuate section 84, a minimum of cam length is presented to the roller 79, and consequently the length of the paper strip which the machine cuts off will be a minimum length. The possible maximum would be with the cams set in such position that the arcuate lengths 84 and 85 are added to each other.

When the roller 79 leaves the camming surfaces, the spring 72 causes the shifter arm 68 to move to the left, as viewed in Figure 7, thereby engaging the clutch members and forcing the surface of the hub portion 57 into frictional engagement with the friction disc 55 and further urging the disc into frictional engagement with the flange 52. A gear 90 is keyed to the shaft 33.

A stud shaft 88 is mounted in a boss 89 of the side plate 21. An idler gear 91 meshes with the gear 90 and freely rotates on the shaft 88. The shaft 82 is journalled in suitable bearings in the side plates 21 and 22, and has keyed thereto a gear 92 which meshes with the idler gear 91. The sprocket 93 is secured on the shaft 82 in any suitable manner, for example by means of a set screw 94. The function of this sprocket will be presently described.

The shaft 33 also has secured thereto, at the right end thereof as shown in Figures 4 and 7, one element, generally designated by the numeral 97, of a Geneva movement. The member 97 has a hub 98, a disc-like portion 99, and an actuator arm 100, the latter of which may be more clearly seen in Figure 2. The actuator arm 100 carries a roller 101 pivoted on a stud 102.

A shaft 103 is journalled in the side plates 21 and 22 (Figures 5 and 7), and has a portion projecting from the side plate 22 which has keyed or otherwise secured thereon the other half 104 of the Geneva movement.

The Geneva member 104 has a hub 105 which is secured to the projecting end of the shaft 103. The shape of this Geneva member may be best seen in Figure 2. It consists of a plate 104 having six equally spaced slots 106 formed therein. These slots are adapted to be engaged by the roller 101 above referred to.

Between the slots are hollow curved surfaces 107, each of which fit the outer surface of the disc-like portion 99. As the member 97 rotates (Figure 2), it reaches a point where the roller 101 enters the slot 106 and the clearance portion 99$^a$ presents clearance for the extremities 106$^a$ and 106$^b$ of the slot 106. As the member 97 continues to rotate, the Geneva member 104 is rotated one-sixth of a revolution. Upon further rotation, the roller 101 leaves the slot 106, and the next succeeding hollow curved portion 107 is engaged by the disc 99, so that the shaft 103 has been rotated one-sixth of a revolution and remains at rest as the shaft 33 continues to rotate.

Figures 8, 9, 10, 11:
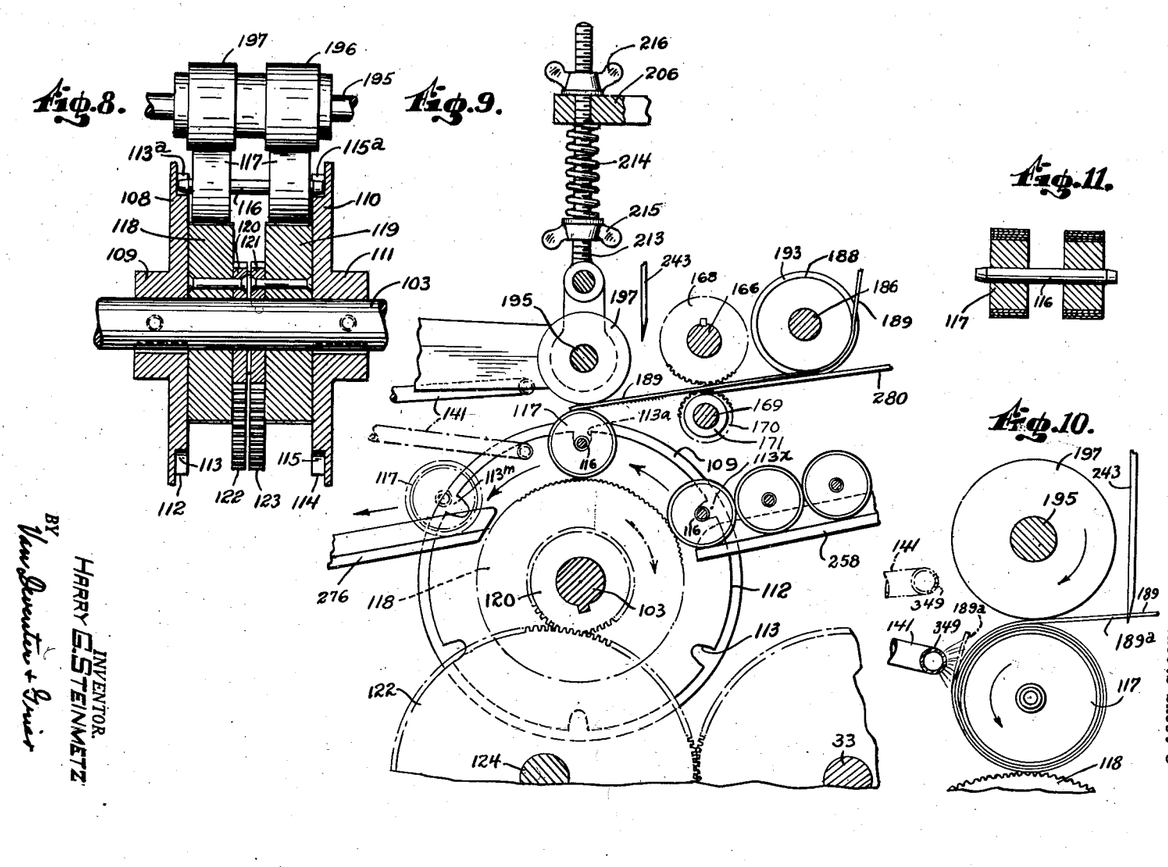
Figure 8 is an elevation, partly in section, of the turret showing a drawing roll in the operative position therein.
Figure 9 is a diagrammatic view showing the feeding of drawing rolls to the turret, the discharge of covered drawing rolls therefrom, and also showing the starting of a strip of parchment paper on to the drawing roll in the operative position.
Figure 10 is a diagrammatic view showing the cutting off of the applied strip of parchment paper from the roll of paper, and the finishing off of the severed end.
Figure 11 is a sectional view of a drawing roll.

Secured to the shaft 103 (Figure 3) is a disc-like member 108 having a hub 109, and spaced apart therefrom on the shaft 103 is a second disc-like member 110 having a hub 111 (see also Figures 8 and 5).

Figure 6:
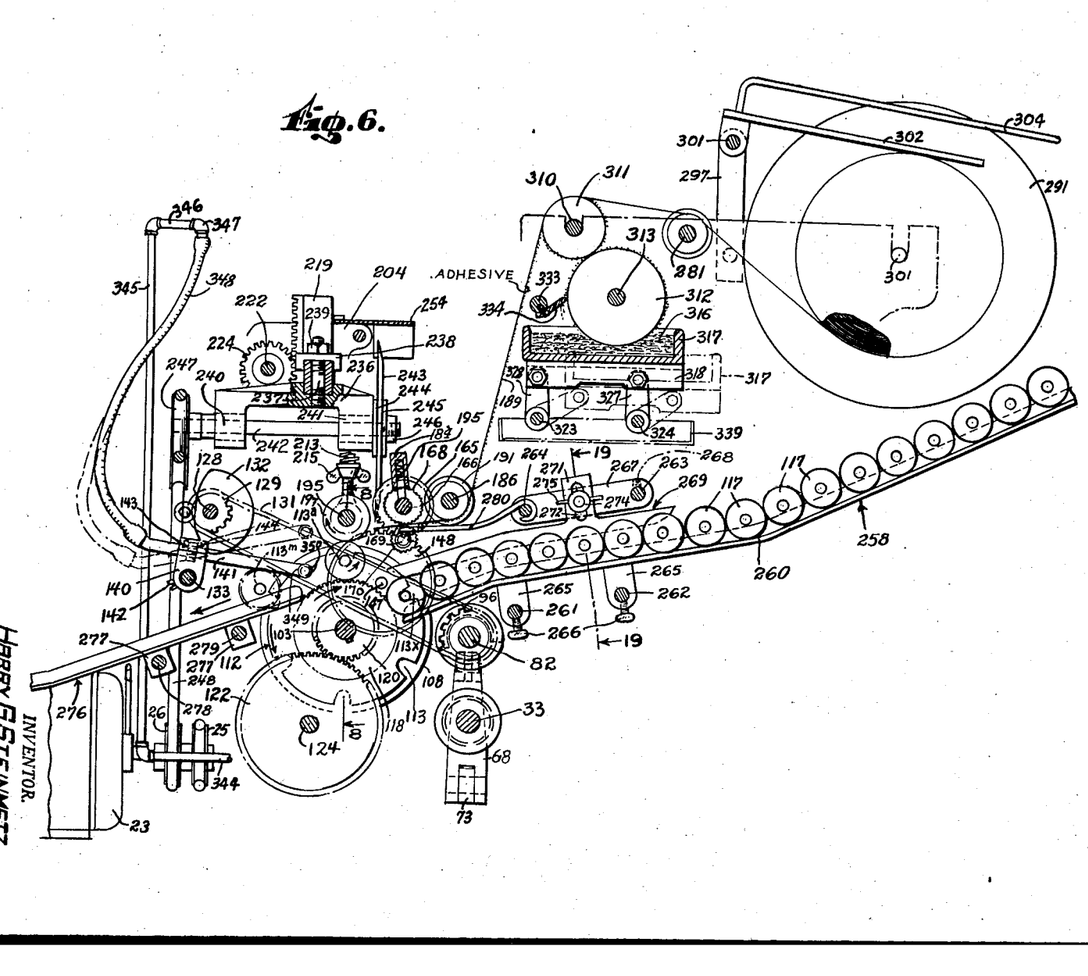
Figure 6 is a sectional elevation as seen along the line 6—6 of Figure 5, parts of the frame having been omitted for the sake of clarity.

Referring now to Figures 6, 8 and 9, the disc 108 has a portion of its face on the opposite side of the hub 109 stepped and terminating in the surface 112. A plurality of depressions 113 are formed in the disc 108 in such a manner that they extend radially from the surface 112. There are six such depressions, and the disc is so keyed to the shaft 103 that for each movement of the Geneva, one depression is at the top vertical position (the position 113$^a$, Figure 9).

The disc 110 has a portion of its face on the opposite side of the hub 111 stepped and terminating in the surface 114. A plurality of depressions 115 are formed in the disc 108 and extend radially from the surface 114 toward the shaft 103. There are six such depressions, and the disc is so keyed to the shaft 103 that for each movement of the Geneva, one depression is at the top, or position 115$^a$. These depressions formed in the discs face each other and are adapted to accommodate the ends of the shaft 116 of the drawing rolls 117.

Continuing with Figure 8, a fluted roller 118 is journalled on the shaft 103 and has its left face membering up with the right face of the disc 108. A second fluted roller 119 is also journalled on the shaft 103, and has its right face membering up with the left face of the disc 110. A pinion 120 also journalled on the shaft 103, is riveted or otherwise fixed to the fluted roller 118, and a like pinion 121 is journalled on the shaft 103 and is riveted or otherwise secured to the fluted roller 119.

A gear 122 meshes with and forms a means for driving the pinion 120 and thereby rotating the fluted roller 118. A second gear 123 meshes with the pinion 121, and thereby drives the fluted roller 119. The diameter of the fluted rollers 118 and 119 are such that the faces or working surfaces of the drawing roll 117 are in contact therewith, and thereby prevent the ends of the shaft 116 from resting on the bottoms of the depressions 113$^a$ and 115$^a$. The purpose of this will hereinafter be described in detail.

The gears 122 and 123, referring now to Figure 3, are keyed or otherwise secured to a shaft 124. The shaft 124 is journalled in bearings 125 in the side plate 21 (Figure 1), and the bearing 126 in the side plate 22 (Figure 2), and carries gears 122 and 123, which mesh with the pinions 120 and 121, respectively, in the turret. The shaft 124 also has keyed thereto a gear 127 which meshes with the gear 56 on the main drive shaft.

With the machine operating, the clutch 59, 62, is disengaged by the roller 79. When the shifter arm 68 is released, by the disengaging of the roller 79 by the cam 84, the spring 72 forces the clutch teeth 60, 63, together to cause the gear 56 to be frictionally driven.

The gear 56 rotates the gear 127, which causes the rotation of the shaft 124, and the gears 122 and 123, which are keyed thereto, drive the fluted rollers 118, 119, through the medium of the pinions 120 and 121, and effect the application of the parchment paper to the surface of the drawing roll 117 in the operative position in the turret. (See Figures 3, 8 and 9.)

A shaft 128 is journalled in the side plates 21 and 22, and has keyed or otherwise secured thereto, a sprocket 129. The shaft 82 has keyed or otherwise secured thereto a sprocket 93, which was above described in connection with Figure 7. A chain 131 operatively connects the sprocket 93 with the sprocket 129. The shaft 128 has secured thereto a cam 132 (Figures 2, 4, 6 and 16).

A shaft 133 is journalled in the side plates 21 and 22 and has keyed or otherwise secured thereto a bell crank 134, the bell crank 134 having an arm 135 which carries a roller 136. The roller 136 is carried on a stud mounted in the arm 135 and is engaged by the surface of the cam 132 (Figure 3).

The bell crank also has an arm 137 (see Figure 2) which is connected to one end of a spring 138. The other end of the spring is connected to a loop 139 on the base 20, with the result that the spring 138 always urges the roller 136 (Figure 3) in contact with the surface of the cam 132.

The shaft 133 has secured thereto a member 140 which forms a support for an air pipe 141. The member 140 is secured to the shaft 133, for example by means of a set screw 142, and has its upper end, as seen in Figure 6, cross-drilled to accommodate the pipe 141. The cross-drilled portion may be split so as to provide a removable cap 143 and secured to the member 142 by means of screws, one of which is shown at 144 (Figure 6).

As the shaft 128 rotates (Figure 6), the roller 136 follows the contour of the cam 131 and thereby the air pipe 141 is caused to oscillate along a predetermined path (defined by the contour of the cam itself). The function of the air pipe 141 will hereinafter be described in connection with the actual application of the parchment paper to a drawing roll.

The shaft 128 has keyed or otherwise secured thereto a crank 145 (Figures 1, 3 and 5) having a radial slot 146 formed therein.

A stud shaft 147 supported in the side plate 21 has journalled thereon a gear 148 and a ratchet wheel 149. The ratchet wheel is keyed or otherwise secured to the gear 148 so that as the ratchet is driven it will in turn drive the gear 148. A crank 150 has its hub journalled on the shaft 147 (Figure 4), and has a radial slot 151 formed therein. A collar 152 is provided for retaining the gear, the ratchet and the hub of the crank 150 on the shaft 147. A link member 153 is connected to the cranks 145 and 150. In order to adjust the movement imparted to the crank 150, the slots 146 and 151, above referred to, are used.

The connection between the crank 145 and the upper end of the link member 153, as viewed in Figure 1, is made with a stud bearing 154, such as is seen in Figure 18. The stud bearing is in fact a shouldered screw having a head 155 and a threaded portion 156 of reduced diameter. The shoulder bears against one face of the crank 145, as shown, and a washer 157 is forced against the other side by the nut 158 and retained in such position by the lock nut 159.

A washer 160 is positioned between the link member 153 and the face of the crank 145. A duplicate stud bearing 161 is provided for securing the lower end of the link member 153 to the crank 150 (see also Figure 17). The crank 150 carries a stud 162 upon which is pivotally mounted a pawl 163. A spring 164 is provided for urging the end of the pawl 163 into engagement with the ratchet wheel 149.

The gear 148, which is driven by the ratchet wheel 149, in turn drives a gear 165 which is secured to a shaft 166. (Figure 17 and also Figure 6.) Keyed or otherwise secured to the shaft 166 are fluted rollers 167 and 168 (see also Figures 5 and 9).

A shaft 169, supported in the side plates 21 and 22, carries fluted rollers directly beneath the fluted rollers 167 and 168, and engaged by the latter, as will presently be described. One of the fluted rollers carried on the shaft 169 may be seen in Figures 6, 9 and 17, and is designated by the numeral 170, and suitable collars, one of which is shown at 171, are provided on the shaft 169 for preventing the fluted rollers thereon from moving endwise.

The bearing 166a for the shaft 166 is slotted, and the shaft 166 is urged downwardly by means by a plunger 179.

A bar 172 (Figure 1) has one end pivotally connected to the side plate 21 by means of a pivot pin 173 passing therethrough. The other end of the bar 172 is longitudinally slotted, and within the slot thus formed is the body 174 of a swing bolt which is pivotally connected to the side plate 21 by means of a pin 175. A wing nut 176 is provided for securing said last-mentioned end of the bar 172. This bar also carries a boss 177 which is bored and has mounted therein a spring 178 and the plunger 179 above referred to. The spring 178 constantly urges the plunger against the shaft 166 and forces it down to the bottom of the slotted bearing 166a. The friction of the plunger prevents the shaft 166 from tending to over-run.

The bar 172 may be quickly released by loosening the wing nut 176, swinging the bolt 174 in the direction of the arrow, following which the bar 172 may be raised and the shaft 166 may be removed from its bearing 166a. Another shaft, to be presently described, may be removed at the same time, both for the purpose of cleaning the adhesive therefrom at the end of a period of operation.

Figure 2:
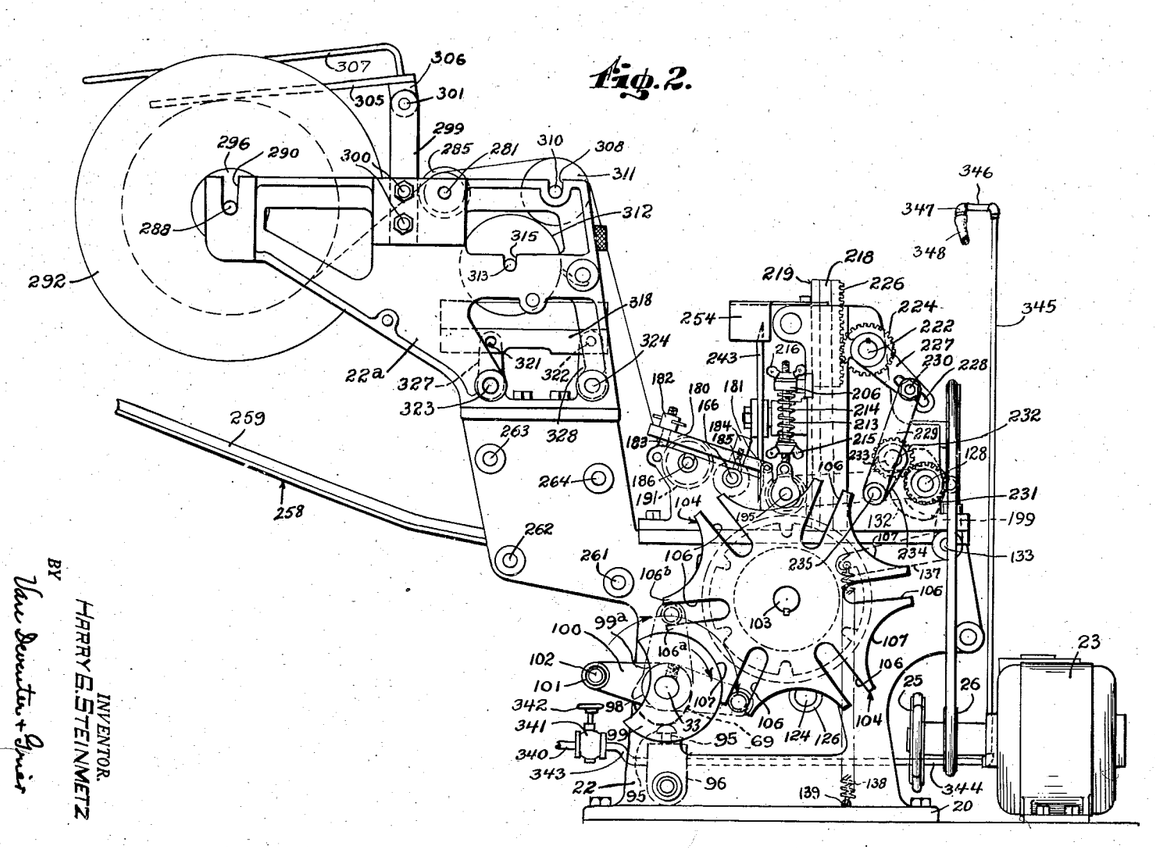
Figure 2 is a right side elevation of the machine shown in Figure 1.

Referring now to Figure 2, a similar bar member 180 has one end pivotally connected to the side plate 22 by a pivot pin 181, and the other end secured by means of a bolt 183 carrying a wing nut 182. A boss 184 carries a spring-pressed plunger 185, which functions exactly like the plunger 179 above described in connection with Figure 1.

For removing the shaft 166, both the bar 172 and the bar 180 are released in the manner described, permitting the operator to bodily lift the shaft 166 from its bearings.

A shaft 186 (Figures 1, 2, 5, 6 and 9) is supported in slotted bearings in the side plates 21 and 22, and carries rollers 187 and 188 for guiding the paper strips 189, 190. The roller 187 has a sleeve portion 191 which is secured thereto by means of a set screw 192 (Figure 5). For accommodating different widths of paper strips, the set screw 192 may be loosened and the sleeve 191 adjusted accordingly. The roller 188 has a similar sleeve 193 secured thereto by a set screw 194.

A shaft 195 (Figures 1, 2, 3, 4, 5, 6 and 17) carries rollers 196 and 197 (Figures 5 and 8) which apply the paper strips directly to the drawing rolls.

The support for the shaft 195 is comprised of distance arms 198 and 199. The distance arm 198 has a bossed portion 200 at one end which forms a working fit on the shaft 128, and a bossed portion 201 at the other end in which one end of the shaft 195 is journalled. The distance arm 199 likewise has a boss 202 journalled on the shaft 128, and a boss 203 in which the other end of the shaft 195 is journalled.

A support 204, which is formed in part by an extension of the side plates 20 and 21, has projecting lugs 205 (Figure 1) and 206 (Figure 2) formed thereon. The boss 201 has a lug 207 which carries a pivot pin 208 pivotally connecting a threaded rod 209 thereto.

A spring 210 has its upper end bearing against the projecting lug 205, and its lower end contacting a wing nut 211. A second wing nut 212 is positioned on the threaded rod above the lug 205 so that by adjusting the wing nuts 211 and 212, any desired tension between the roller 196 and the drawing roll in the operative position (Figure 8) may be obtained.

Likewise the boss 203 has connected thereto a threaded rod 213 carrying a spring 214, the upper end of which is in contact with the lug 206, and the lower end of which is in contact with a wing nut 215. A second wing nut 216 is carried on the upper end of the threaded rod, and by means of these wing nuts any desired tension may be exerted between the roller 197 and the drawing roll 117 at the operative stage (Figures 8 and 9). The distance arms 198 and 199 permit the shaft 195 to remain parallel to the other shafts and at the same time permit movement against the springs 210 and 214.

Referring to Figure 5, a vertical slot 217 is formed in the side plate 21 facing inwardly, and a second vertical slot 218 is formed in the side plate 22 in line with and directly facing the slot 217. A sub-frame member 219 has a tongued portion 220 at one end thereof forming a working fit in the slot 217, and a second tongued portion 221 at the other end thereof forming a working fit in the slot 218, so that the sub-frame may be reciprocated vertically in the frame.

A shaft 222 is journalled in the side plates 21 and 22 and has keyed thereto a gear 223 near one end thereof, and a gear 224 near the other end thereof. A vertical rack 225 secured to the sub-frame 219 meshes with the gear 223, and a second rack 226 secured to the sub-frame 219 meshes with the gear 224 so that as the shaft 222 is partially rotated, the sub-frame may be moved up and down. The shaft 222 has a portion projecting through the side plate 22, and a crank arm 227 is keyed thereto (see also Figure 2).

A radial slot 228 is formed in the crank 227. A connecting rod 229 has its upper end, as seen in Figure 2, adjustably connected to the crank 227 through the medium of a stud bearing 230 cooperating with the slot 228. This stud bearing is just like the stud bearing 154 shown in Figure 18 and described above in connection with said figure.

The shaft 128 has a portion projecting through the side plate 22, to which is keyed or otherwise secured a gear 231 (see also Figure 3). A gear 232 is mounted on a stud shaft 233 carried on the side plate 22. A crank 234 is secured in driven relation to the gear 232, and has its outer end connected to the lower end of the connecting rod 229 by means of a wrist pin 235, so that as the shaft 128 rotates, its gear 231 drives the gear 232 and the crank 234 in the opposite direction and through the medium of the connecting rod 229 and the crank 227, the shaft 222 is oscillated and in turn the sub-frame 219 is vertically reciprocated.

The sub-frame 219 may be termed a knife carriage, and a member 236 is secured thereto by means of a bolt 237 passing through the sub-frame 219 and through a yoked member 238, and further engaged by a nut 239.

The member 236 has a bearing boss 240 at one end thereof and a bearing boss 241 at the other end thereof (this is better seen in Figure 6). A shaft 242 is journalled in the bearing bosses 240 and 241 and has secured to one end thereof a rotary knife 243 between a flange 244 formed integral with or fixed to the shaft 242 and a washer 245, a nut 246, being provided for retaining the knife thereon.

The other end of the shaft 242 has keyed or otherwise secured thereto a grooved pulley 247; the belt 248 is provided for driving the pulley 247. This belt engages the pulley 26 on the motor 23, and also passes over idler pulleys 249 and 250 (Figure 3) which are supported on stud shafts 251 and 252, respectively, carried on a bracket 255 secured to the side plate 22 by means of a bolt 256 extending through a slot 257 in said bracket. The slot 257 permits the bracket to be adjusted on its support 22. The bracket is also provided with a slot 253 along which the stud 251 may be adjusted for maintaining proper tension on the belt 248.

It will be noted that the horizontal plane of the shaft 242 is somewhat in line with the stud shaft 251, thereby permitting movement of the knife shaft without materially loosening the belt, so that the paper may be cut off at the proper time in the operative cycle of the machine. A guard 254 is provided to prevent an operator from accidentally coming in contact with the knife 243.

The knife, as may be seen from the above description, is moved downwardly at a predetermined time during the operative cycle of the machine for cutting off the paper after a predetermined length of paper has passed the knife position. For causing the knife to move down at a different point in the machine cycle, the stud bearing 230 may be loosened and adjusted in the slot 228 to obtain a different setting, and when the desired setting is obtained, the stud 230 may be locked in its adjusted position.

Between the side plate 21 and the side plate 22 are distance rods 261, 262, 263 and 264. For feeding the drawing rolls to the turret, a trackway, generally designated by the numeral 258, and including rails 259 and 260 are provided (Figures 1, 2, 4 and 19).

The rails are provided with lugs 265 which engage the distance rods 261 and 262, and these lugs are provided with screws 266 for retaining said lugs on said distance rods (Figure 1).

In Figure 6, the trackway is shown loaded with drawing rolls 117. The lowest drawing roll 117 enters the depression 113 in the position 113$^x$ in the turret, so that when the turret is moved in the direction of the arrow one-sixth of a revolution, the drawing roll is carried therewith to the position 113$^a$, which has been heretofore described as the operative position. When this occurs, the succeeding drawing roll on the trackway then enters the next depression 113 in the position 113$^x$, and in this manner the drawing rolls are successively fed into the turret.

A bar 267 is mounted on the distance rods 263 and 264, and may be secured thereon in any suitable manner, for example by set screws one of which is designated by the numeral 268. The bar 267 has secured thereto a guard rail 269 which may be seen in section in Figure 19. This guard rail has a head 270 which is substantially triangular in cross section and formed integral therewith is a web portion 271 which has a vertical slot 272 formed therein to permit it to be adjusted vertically on the bar support 267.

A bolt 273 extending through the slot 272 threadedly engages the bar 267 and has a head 274 which shoulders against the web 271 for securing said web against the bar 267 in any adjusted position.

A cross rod 275 in the head 274 is provided to permit the operator to tighten or loosen the bolt 273 by hand. The guard rail 269 prevents the drawing rolls 117 from "piling up."

A second trackway 276 is provided for leading the covered drawing rolls away from the turret. This trackway is provided with rails similar to the rails 259 and 260, and these rails are provided with lugs 277 which may be secured to distance rods 278 and 279 by means of screws (not shown).

The upper end of the discharge trackway 276 is so positioned that as a drawing roll reaches the position 113$^m$, it rolls out of the depression 113 and down the trackway 276 under the urge of gravity.

A guide member 280 for the paper strip 189 has one end partially embracing the distance rod 264, and has its other end supported on the shaft 169 adjacent to the fluted roller 170. This prevents the strip 189 from falling down and insures its guidance between the fluted rollers 168 and 170. A guide member similar to the guide member 280 is also provided for the paper strip 190.

The side plate 21 has an extension 21$^a$, and the side plate 22 has an extension 22$^a$ (Figures 1, 2, 3, 4 and 5). A shaft 281 is journalled in the extensions 21$^a$ and 22$^a$ (Figures 4 and 5).

Secured to the shaft 281 is a roller 282 and a second roller 283. These rollers are exactly like the rollers 187 and 188, and they have sleeve portions 284 and 285, respectively, secured thereto by set screws 286 and 287, so that the active width of the rollers may be varied in accordance with the width of the paper strips 189 and 190 and locked in any adjusted position by means of the set screws 286 and 287.

A shaft 288 has end portions of reduced diameter and mounted in a slot 289 in the extension 21ª, and in a slot 290 in the extension 22ª.

Mounted on the shaft 288 are a reel 291 carrying the paper strip 189 and a reel 292 carrying the paper strip 190. Washers or collars 293 and 294 between the reels define the intermediate distance, and outside washers or collars 295 and 296 secured to the shaft 288 maintain the reels in alignment with the rollers 282 and 283.

Continuing with Figure 5, an upright bar 297 is mounted in an accommodating slot in the extension 21ª, and is secured therein by bolts 298. A similar bar 299 is mounted on the side plate extension 22ª in the same manner and is secured by bolts 300.

A shaft 301 has its ends supported in the upper ends of the bars 297 and 299. A bar 302 forming a presser-foot bears against the surface of the paper in the reel 291 to restrain it and prevent the reel from over-running. A plan view of this bar is seen in Figure 5, and an elevation in Figure 1.

A lug 303 secured to the bar 302 has a hole therein which forms a working fit on the shaft 301. A rod 304 secured to the bar 302 overlies the majority of the surface of the length of the bar 302, and serves to increase the pressure exerted by the bar 302 upon the paper on the reel 291. The rod 304 may in some types of work have a weight (not shown) mounted thereon.

The second bar 305 forms a presser-foot for the material on the reel 292 (Figures 2 and 5). This bar also carries a lug 306 which also has a hole formed therein and forming a working fit on the shaft 301. A rod 307, similar to the rod 304, is secured thereto for the same purpose.

A slotted bearing 308 is formed in the extension 22ª, and a second slotted bearing 309 in the extension 21ª, and in alignment with the bearing 308. These bearings are provided to accommodate the reduced ends of a shaft 310 (Figures 1, 2 and 5).

A roller 311 is carried on the shaft 310 and is provided for applying adhesive to the paper strips 189, 190, as they are fed from the reels 291, 292. This roller obtains adhesive from a roller 312 which is in turn carried on a shaft 313, the ends of which are supported in slotted bearings 314, 315.

The roller 312 has its lower surface normally in contact with adhesive material 316 in the adhesive pan 317. The adhesive pan is supported on a suitable supporting member or base 318. The base 318 is provided with studs 319 and 320 extending from one end thereof (Figure 1), and studs 321 and 322 extending from the other end thereof (Figure 2).

Shafts 323 and 324 journalled in the extensions 21ª and 22ª have keyed or otherwise fixed thereto cranks 325 and 326, engaging the studs 319 and 320, respectively, on one end of said support, and cranks 327 and 328 at the other end thereof. The cranks 327 and 328, respectively, engage the studs 321 and 322. These cranks are keyed or otherwise secured to the shafts 323 and 324.

The normal position of the cranks is vertical, and they are maintained in this position by means of a lever 329, one end of which is keyed to the shaft 324, and the other end of which carries a plunger pin 330, which engages a hole 331 in the side plate extension 21ª (see Figures 1 and 3).

When the lever 329 is in the position shown in Figure 1, the adhesive pan 317 is in its normally operative position, and the roller 312, the bottom of which is submerged in the adhesive, as it rotates will carry the adhesive from the pan 317 and deliver it to the roller 311.

When it is desired to lower the adhesive pan for removal, cleaning, or for replenishing the adhesive, the plunger 330 is pulled toward the operator, as seen in Figure 1, thus releasing it from the hole 331 with which it was engaged. The lever 329 is then swung in a clockwise direction, and the plunger 330 is engaged with the hole 332. This lowers the adhesive pan to the position shown in dot-dash lines in Figure 6, which is well away from the roller 312, to permit said operations to be performed.

A shaft 333 is journalled in the extensions 21ª and 22ª (Figures 1 and 6), and has secured thereto a scoop member 334 which is adapted to be placed in engagement with the roller 312 for scraping or squeegeeing adhesive from the surface thereof.

A crank 335 has its hub secured to the shaft 333, and has its arm portion extending upwardly. A thumb-screw 336 passes through the crank arm and threadedly engages a threaded hole in a lug 337 on the side plate extension 21ª. A compression spring 338 is positioned on the body of the screw 336 between the lug 337 and the arm, and tends to urge the arm to the left, as seen in Figure 1, and in turn tends to move the squeegee 334 away from the surface of the roller 312.

The operator, by screwing in the thumb-screw 336, may adjust the squeegee to any desired position, and the spring 338 will maintain any adjustment made. (Figures 1 and 5.)

Referring now to Figure 6, a drip pan 339 may be positioned below the adhesive pan to catch any dripping or overflow therefrom. This drip pan is shown diagrammatically in Figure 6, and is preferably positioned on a metal plate (not shown) lying on the junction line between the side plates 21 and 22 and the side plate extensions 21ª and 22ª. It may be easily slid into place and moved at the will of the operator.

A pipe 340 is connected to a source of air and to a valve 341 having a handle 342 for controlling the supply of air to the machine. A pipe 343 has one end connected to the valve 341, and its other end is connected to the valve 96. The plunger 95 of this valve 96 is actuated by the cam 69, as was hereinbefore described.

Leading from the air valve 96 is a horizontal pipe 344 which is connected through an elbow to a vertical pipe 345. A short length of horizontal pipe 346 is connected by means of an elbow to the vertical pipe 345, and carries a fitting 347 to which one end of a flexible hose is connected (Figure 2).

Turning now to Figures 1 and 6, it will be seen that the flexible hose 348 is in turn connected to the air pipe 141, so that each time the plunger 95 is depressed by the sam 69, air is delivered to the air pipe 141. The end of the air pipe 141, adjacent to the operative position of the drawing roll, is provided with a short section at right angles thereto and having its ends closed. This section, designated by the numeral 349, is provided with a series of perforations 350 through which air may escape (see also Figure 5).

The air pipe 141, as previously described, is caused to oscillate under control of the cam 132.

The normal position of the air pipe is shown in dot-dash lines in Figure 6, and the solid lines in this figure show it in its extreme lowermost position.

By moving the air pipe under control of the cam, the air is delivered to the work when the latter is in a normal position, and the direction of delivery is constantly changed as the work progresses, through the medium of the cam 132.

Operation

A number of drawing rolls 117 are positioned on the trackway 258, and they immediately roll down until the lowermost one enters the depression 113ˣ (Figures 6 and 9). This is, of course, assuming that the machine is empty at the beginning of the operation.

After the motor 23 has been started up, the operator rotates the knob 48 (Figure 7), thereby tightly clamping the hub of the wheel 43, the friction disc 39, the hub 37 of the sprocket 32, the friction disc 38, and the flange 40 together, thereby causing the power to be transmitted to the main shaft 33.

The roller 101 on the arm 100 engages a slot 106 of the star wheel of the Geneva movement, and causes this star wheel to advance one step, which in the embodiment shown is one-sixth of a revolution (see Figure 2). Now, when the shaft 103 is rotated one-sixth of a revolution, the turret (refering now to Figure 6) moves to such position that the depressions formerly in the position 113ˣ and now containing the first drawing roll to be covered, are (together with the drawing roll) moved to the position 113ᵃ, which is herein called the "operative" position.

By the time the first drawing roll reaches the position 113ᵃ, the succeeding depressions in the turret are in position to receive the second drawing roll from the trackway 258.

The paper strips 189 and 190 have passed over the roller 311 and have been coated with adhesive, as indicated in Figure 6. As the action on both is the same, only one paper strip need herein be described, and the one refered to is the strip 189 which passes between the fluted rollers 168 and 170 (see also Figure 9). The paper strip is fed, diverting for a moment to Figure 17, through the action of the cam 132, the linkages connected thereto, and the pawl 163 and the ratchet 149, the linkages being so set that in the present instance a sufficient length of paper strip is fed to go around the drawing roller two-and-one-half times. It will be understood, of course, that the linkages may be set to feed a greater or a lesser length of paper strip.

The fluted roller 118 is rotated in a clockwise direction (the direction of the arrows thereon), and this causes the drawing roll 117 at the operative position 113ᵃ to rotate in a counter-clockwise direction. The roller 197 bearing on the drawing roller is rotated in a clockwise direction.

The end of the paper strip 189 passes between the drawing roll and the roller 197, and since the lower surface of this paper strip carries adhesive, the strip adheres to the surface of the drawing roll, and as the paper continues to be fed by the ratchet feeding mechanism, this paper is wound on the drawing roll 117.

Properly timed with the mechanism is the rotary knife 243, which moves downwardly and severs the strip 189. This severance occurs at such a point that the cut-off piece of strip, when applied to the drawing roll and finished off, will be exactly two-and-one-half turns. The severing is shown in Figure 10 in solid lines, and the severed end is designated by the numeral 189ᵃ. As this end passes between the roller 197 and the drawing roll 117, the air pipe 141 begins to lower from the dot-dash position shown in Figure 10, towards the solid position.

The air escaping from the cross portion 349 causes the severed end 189ᵃ to be adhered to the rest of the paper on the drawing roll without its having been pressed into contact with the layer of paper below by means of the fluted roller 118. This leaves a short portion of the severed end 189ᵃ unadhered to the rest of the roll; in other words, it is somewhat like a tab.

As the turret is again advanced, the drawing roll just covered reaches the position 113ᵐ, the air pipe 141 having been moved out of the way under control of the cam 132, whereupon the covered drawing roll, rolls on to the second trackway 276.

It will be noted that as the finished drawing roll was moved from the operative position to the discharge position 113ᵐ, the second drawing roller is at the same time moved from the position 113ˣ to the operative position 113ᵃ, and the third drawing roller enters the turret at the position 113ˣ.

It will further be noted that the period of rotation of the fluted roller 118 is effected by the engaged clutch teeth 60, 63, and further the period of engagement is controlled by the cam 80, 84, 83, 85, acting against the roller 79 (see Figure 7). The clutch teeth are disengaged when the drawing roll 117 and the strip 189ᵃ being applied thereto, reaches the position shown in dotted lines in Figure 10.

Air from the air pipe 141 forces the outer layer of the strip into adhesive contact with the preceding layer, except for a short portion which is left free, as shown in Figure 10.

It is obvious that the cam cooperating with the roller 79 can be set for longer or shorter periods of rotation of the fluted roller 118. If set for longer periods, the cam would cause the drawing roll to continue to rotate in the direction of the arrow, until after the fluted roller 118 has pressed the tab 189ᵃ into contact with the layer beneath it, thus finishing the drawing roll off smoothly. However, for producing certain results in the spinning of the yarn, I prefer to leave the tab 189ᵃ free.

Although I have herein shown and described a preferred embodiment of my new and improved machine for applying parchment strips to the surfaces of drawing rolls, it is obvious that many changes may be made in the arrangement herein shown and described without departing from the spirit of the invention as set forth in the annexed claims.

What is claimed is:

1. In a machine for applying strip material to the cylindrical surfaces of drawing rolls, a turret having a plurality of depressions formed therein to accommodate the shafts of said drawing rolls, said turret being adapted to be moved in steps from a loading position to an operative position and thence to a discharge position, trackage for a plurality of said rolls to be operated upon, said trackage having its lower end adjacent to said loading position, a second trackage for finished drawing rolls having its upper end adjacent to said discharge position, roller means adapted to engage the surfaces of said drawing rolls when in the operative position, said means being adapted to floatingly support said drawing roll and including at least one driven fluted roller, means for applying adhesive to said material, means for guiding and adhering said material to the surface of said drawing rolls, cutting-off means for said material positioned adjacent thereto, means for moving said cutting-off means into engagement with said material after a predetermined length of said material has passed by said cutting-off means, said last means including a crank having a radial slot formed therein and a connecting rod adjustably connected thereto by means of a stud bearing cooperating with said slot and means including a moving air blast effective during a predetermined portion of the operating cycle of said machine for adhering the severed trailing end of said material to the material already adhered, with the exception of a short length at the extreme end thereof, which is left free to form a tab.

2. In a machine operating cyclically for applying strip material to the cylindrical surfaces of drawing rolls, roller means for floatingly engaging the surfaces of said drawing rolls and including at least one roller the surface of which is fluted, means for applying adhesive to said strip material, means for feeding said strip material between said roller means and the surface of a drawing roll, a main shaft carrying a driven member, means for driving the latter, manually operable clutch means for placing said shaft in driven relation to said driven member, a second shaft in said machine, gearing between said first and said second shafts, a second clutch on said first shaft, including spring means tending to urge the same into engagement, disengaging means for said second clutch, gearing between said second clutch and said fluted roller, and cam means on said second shaft cooperating with said disengaging means for defining the periods of engagement and disengagement of said second clutch during each cycle of said machine.

3. In a machine operating cyclically for applying strip material to the cylindrical surfaces of drawing rolls, roller means for floatingly engaging the surfaces of said drawing rolls and including at least one roller the surface of which is fluted, means for applying adhesive to said strip material, means for feeding said strip material between said roller means and the surface of a drawing roll, settable means for controlling the length of strip material fed to said surface, means for severing the strip of material being applied to said surface from said supply, a main shaft carrying a driven member, means for driving the latter, manually operable clutch means for placing said shaft in driven relation to said driven member, a second shaft in said machine, gearing between said first and said second shafts, a second clutch on said first shaft, including spring means tending to urge the same into engagement, disengaging means for said second clutch, gearing between said second clutch and said fluted roller, and cam means on said second shaft cooperating with said disengaging means for defining the periods of engagement and disengagement of said second clutch during each cycle of said machine.

4. In a machine operating cyclically for applying strip material to the cylindrical surfaces of drawing rolls, a frame, roller means in said frame for floatingly engaging the surfaces of said drawing rolls and including at least one roller the surface of which is fluted, means for applying adhesive to said strip material, means for feeding said strip material between said roller means and the surface of a drawing roll, settable ratchet means for controlling the feeding of said strip material to said surface, a rotary knife for severing the strip of material, a knife carriage vertically movable in said frame, a pair of racks mounted on said carriage in spaced relation to each other, a pinion for each of said racks and keyed to a common shaft on said frame, crank means on said common shaft, a main shaft carrying a driven member, means for driving said member, manually operable clutch means for placing said shaft in driven relation to said driven member, a third shaft journalled in said frame, positive driving means between said main shaft and said third shaft, a second crank secured to said third shaft in substantial alignment with said crank means, and a link member joining said crank and said crank means for causing said common shaft to oscillate as said third shaft is driven by said main shaft, thereby lowering said knife to sever said strip and thereafter raising said knife from the path of said strip.

5. The invention according to claim 4, in which the link member between said crank and said crank means is adjustable, thereby permitting the path of movement of said knife to be varied within desired limits.

6. In a machine for applying strip material to the active surfaces of drawing rolls, a frame, a turret journaled on said frame and having a plurality of depressions formed therein to accommodate said drawing rolls, said turret having means connected thereto for moving the same in steps from a loading position to an operative position and thence to a discharge position, a plurality of shafts journaled on said frame, driving means for at least one of said shafts, positive driving connections between said last-mentioned shaft and another of said shafts, a plurality of rollers engaging the surfaces of said drawing rolls when in said operative position, one of said rollers being fluted and adapted to be connected in driven relation to one of said shafts, cam means on said another of said shafts, and clutch means included in the connections to said fluted roller, and a lever connected to said clutch means and actuated by said cam for controlling the engagement and disengagement of said clutch means.

7. In a machine for applying strip material to the cylindrical surfaces of drawing rolls, a turret having a plurality of depressions formed therein to support the ends of the shafts of said drawing rolls, said turret being adapted to be moved in steps from a loading position, to an operative position, to a discharge position, and to a fourth position intermediate said discharge position and said loading position; means to sequentially deliver drawing rolls to be operated upon to the depressions in said turret as they are moved to their loading positions, other means for receiving finished drawing rolls from the depressions in said turret as they are moved to their discharge positions, roller means adapted to engage the outer peripheral surfaces of said drawing rolls when they are in said operative positions and floatingly support the same, said roller means including at least one drive fluted roller, means for applying adhesive to said material, means for guiding and adhering said material to the surfaces of said drawing rolls, cutting-off means positioned adjacent to said material, means for moving said cutting-off means into engagement with said material after a predetermined length of material has passed by said cutting-off means, said last means including a crank having a radial slot formed therein and a connecting rod adjustably connected thereto by means of a stud bearing cooperating with said slot, and means including a moving air blast effective during a predetermined portion of the operating cycle of said machine for adhering the severed trailing end of said material to the material already adhered, with the exception of a short length at the extreme end, which is left free to form a tab.

8. In a machine for applying strip material to the cylindrical surfaces of drawing rolls, a turret having a plurality of depressions formed therein to support the ends of the shafts of said drawing rolls, said turret being adapted to be moved in steps from; a loading position, to an operative position, to a discharge position, and to a fourth position intermediate said discharge position and said loading position; means to sequentially deliver drawing rolls to be operated upon to the depressions in said turret as they are moved to their loading positions, other means for receiving finished drawing rolls from the depressions in said turret as they are moved to their discharge positions, roller means adapted to engage the outer peripheral surfaces of said drawing rolls when they are in said operative positions and floatingly support the same, said roller means including a fluted drive roller for causing the floatingly supported roll to rotate, means for applying adhesive to said material, means for guiding and adhering said material to the surfaces of said drawing rolls, cutting-off means positioned adjacent to said material, means for moving said cutting-off means into engagement with said material after a predetermined length of material has passed by said cutting-off means, said last means including a crank having a radial slot formed therein and a connecting rod adjustably connected thereto by means of a stud bearing cooperating with said slot, means for causing said drawing roll to cease its rotation prior to the time the trailing end of the severed material reaches said surface, and means including a moving air blast effective during a predetermined portion of the operating cycle of said machine for adhering the severed trailing end of said material to the material already adhered, with the exception of a short length at the extreme end, which is left free to form a tab.

9. In a machine for applying strip material to the cylindrical surfaces of drawing rolls, a turret having a plurality of depressions formed therein to support the ends of the shafts of said drawing rolls, said turret being adapted to be moved in steps from; a loading position, to an operative position, to a discharge position, and to a fourth position intermediate said discharge position and said loading position; means to sequentially deliver drawing rolls to be operated upon to the depressions in said turret as they are moved to their loading positions, other means for receiving finished drawing rolls from the depressions in said turret as they are moved to their discharge positions, roller means adapted to engage the outer peripheral surfaces of said drawing rolls when they are in said operative positions and floatingly support the same, said roller means including at least one driven fluted roller, means for applying adhesive to said material, means for guiding and adhering said material to the surfaces of said drawing rolls, cutting-off means positioned adjacent to said material, means for moving said cutting-off means into engagement with said material after a predetermined length of material has passed by said cutting-off means, said last means including a crank having a radial slot formed therein and a connecting rod adjustably connected thereto by means of a stud bearing cooperating with said slot, fluted roller means engaging the drum-like surfaces of the drawing roll in said operative position, smooth roller means engaging said surfaces at points substantially diametrically opposite the points engaged by said fluted roller means, means for applying adhesive to said material, means for feeding said strip material to said surfaces, first between said smooth roller means and said surfaces and, secondly, between said fluted roller means and said surfaces, cutting-off means for said material, means for controlling said cutting-off means whereby said material may be cut off in predetermined lengths, said last means including a crank having a radial slot formed therein and a connecting rod adjustably connected thereto by means of a stud bearing cooperating with said slot, and means independent of said roller means adapted to direct a moving blast of air against the cut-off end of said strip material during a definite portion of the operating cycle of said machine for finishing off the trailing end of said material, and leaving the extreme end thereof as a free tab.

HARRY G. STEINMETZ.